United States Patent
Fujita et al.

(10) Patent No.: US 7,608,553 B2
(45) Date of Patent: Oct. 27, 2009

(54) TRANSPARENT RARE-EARTH OXIDE SINTERED BODY AND MANUFACTURING METHOD THEREOF

(75) Inventors: Mitsuhiro Fujita, Kanagawa (JP); Masaki Irie, Kanagawa (JP)

(73) Assignee: Covalent Materials Corporation, Tokyo (JP)

( * ) Notice: Subject to any disclaimer, the term of this patent is extended or adjusted under 35 U.S.C. 154(b) by 10 days.

(21) Appl. No.: 11/589,795

(22) Filed: Oct. 31, 2006

(65) Prior Publication Data

US 2007/0105708 A1 May 10, 2007

(30) Foreign Application Priority Data

| Oct. 31, 2005 | (JP) | ............................. 2005-317297 |
| Jan. 17, 2006 | (JP) | ............................. 2006-009003 |
| Mar. 22, 2006 | (JP) | ............................. 2006-078294 |

(51) Int. Cl.
*C04B 35/505* (2006.01)

(52) U.S. Cl. ..................................................... 501/152

(58) Field of Classification Search ................. 501/152
See application file for complete search history.

(56) References Cited

U.S. PATENT DOCUMENTS

| 4,421,674 A | * | 12/1983 | Invernizzi et al. ............... 502/9 |
| 4,466,930 A | * | 8/1984 | Greskovich et al. ......... 264/1.22 |
| 4,518,545 A | * | 5/1985 | Cusano et al. .............. 264/1.22 |
| 4,747,973 A | * | 5/1988 | Cusano et al. ......... 252/301.4 R |
| 5,882,547 A | * | 3/1999 | Lynch et al. .......... 252/301.4 R |
| 6,093,347 A | * | 7/2000 | Lynch et al. .......... 252/301.4 R |

FOREIGN PATENT DOCUMENTS

| JP | 2939595 B2 | 6/1999 |
| JP | 2003-89578 A | 3/2003 |

* cited by examiner

*Primary Examiner*—Karl E Group
(74) *Attorney, Agent, or Firm*—Foley & Lardner LLP

(57) ABSTRACT

The invention intends to obtain a transparent yttrium oxide sintered body of which in-line transmittance in a visible wavelength region of 400 to 800 nm at a thickness of 1 mm is 60% or more, without using aluminum that readily segregates in grain boundaries of yttrium oxide, without using special raw materials in which a silicon content is particularly reduced and without finely pulverizing raw materials. A transparent yttrium oxide sintered body that contains, with yttrium oxide as a main component, at least either one of tantalum or niobium or both thereof and has the in-line transmittance of 60% or more at a thickness of 1 mm in a visible wavelength region in the range of 400 to 800 nm.

12 Claims, No Drawings

TRANSPARENT RARE-EARTH OXIDE SINTERED BODY AND MANUFACTURING METHOD THEREOF

BACKGROUND OF THE INVENTION

1. Field of the Invention

The invention relates to a transparent rare-earth oxide sintered body having at least one of yttrium, lutetium and ytterbium, that is used in discharge lamp tubes, laser host materials and materials for plasma observation corrosion-resistant windows of semiconductor producing devices and a manufacturing method thereof.

2. Description of the Background Art

So far, as a manufacturing method of a transparent yttrium oxide sintered body, a transparent lutetium oxide sintered body or a transparent ytterbium oxide sintered body, a technology where a molded body that contains, in terms of metal, aluminum in a range of 5 to 100 wt ppm and silicon of 10 wt ppm or less in one of yttrium, lutetium and ytterbium oxide is sintered at a temperature of 1450° C. or more and 1700° C. or less for 0.5 hr or more in a hydrogen, inert gas, mixed gas of hydrogen and inert gas or vacuum atmosphere is known (for instance, Japanese Patent Unexamined Publication JP-A-2003-89578).

Furthermore, a technology where a mixture of a calcium compound that becomes calcium oxide by pyrolysis in the range of 100 ppm to 4% to yttrium oxide, a zirconium compound that becomes zirconium oxide by pyrolysis in the range of 200 ppm to 10% to yttrium oxide and yttrium oxide of which primary particle diameter is 0.5 μm or less is molded and sintered is known (for instance, Japanese Patent Examined Publication JP-B-2939535).

In a method where an aluminum content is set in the range of 5 to 100 wt ppm in terms of metal, which is described in JP-A-2003-89578, assuredly, a transparent yttrium oxide sintered body, a transparent lutetium oxide sintered body or a transparent ytterbium oxide sintered body can be obtained. However, during the sintering, aluminum tends to segregate in grain boundaries of a yttrium oxide sintered body, a lutetium oxide sintered body or a ytterbium oxide sintered body. Accordingly, in order to inhibit aluminum from segregating, a sintering temperature is necessarily set at a temperature of 1700° C. or less. A sintering temperature of 1700° C. or less is low as a sintering temperature for yttrium oxide, lutetium oxide and ytterbium oxide that are high in the melting point. Accordingly, in order to sufficiently densify at the temperature, in place of a commercially available general-purpose yttrium, lutetium or ytterbium oxide powder, for instance, it is necessary that an aqueous solution of yttrium sulfate, lutetium sulfate or ytterbium sulfate, or yttrium nitrate, lutetium nitrate or ytterbium nitrate, or yttrium oxalate, lutetium oxalate or ytterbium oxalate is neutralized under a controlled temperature and speed to form yttrium hydroxide, lutetium hydroxide or ytterbium hydroxide, the hydroxide is calcined in a controlled atmosphere and temperature, followed by pulverizing, and thereby a raw material excellent in the sinterability is particularly prepared. This is generally not an easy process.

Furthermore, in order to render a silicon content such low as 10 wt ppm or less, a low silicon content raw material has to be prepared particularly. This is neither easy matter.

In addition, in a method according to JP-B-2939535, a primary particle diameter of yttrium oxide is necessarily rendered 0.5 μm or less. A process of finely pulverizing and a special raw material synthesis under severely controlled conditions are necessary. That is, there is a problem in that a general-purpose yttrium oxide powder cannot be used.

Still furthermore, in the JP-B-2939535, since in-line transmittance (the linear transmittance) of a transparent yttrium oxide sintered body having a thickness of 1 mm is only 40 to 60% to light of a wavelength of 500 nm, the transparency is not sufficient. Furthermore, there is another problem in that, because of a problem of contamination, yttrium oxide containing calcium that is an alkaline earth metal cannot be applied to a window material for a semiconductor producing device.

SUMMARY OF THE INVENTION

In view of the above problem, one of objects of the invention is to provide a rare-earth oxide sintered body, without using aluminum that readily segregates in grain boundaries of oxide, without using special raw materials in which a silicon content is particularly reduced and without necessitating to finely pulverize a raw material, a transparent oxide sintered body of which in-line transmittance at a thickness of 1 mm in a visible wavelength region of 400 to 800 nm is 60% or more.

Further, another object of the invention is to provide a transparent yttrium oxide sintered body, a transparent lutetium oxide sintered body and a transparent ytterbium oxide sintered body having no striae.

In order to achieve the above problem, according to a first aspect of the invention, there is provided a transparent yttrium oxide sintered body, comprising:

yttrium oxide as a main component; and
at least one of tantalum and niobium,
wherein in-line transmittance when a thickness thereof is 1 mm in a visible wavelength region in a range of 400 to 800 nm is 60% or more.

According to a second aspect of the invention, as set forth in the first aspect of the invention, it is preferable that an amount of the tantalum is in a range of 0.1 to 1.3 wt % in terms of metal and the in-line transmittance at the thickness of 1 mm in the visible wavelength region in the range of 400 to 800 nm is 60% or more.

According to a third aspect of the invention, as set forth in the first aspect of the invention, it is preferable that an amount of the niobium is in a range of 0.05 to 0.5 wt % in terms of metal and the thickness thereof is 1 mm, the in-line transmittance in the visible wavelength region in the range of 400 to 800 nm is 60% or more.

According to a fourth aspect of the invention, there is provided a manufacturing method of a transparent yttrium oxide sintered body, comprising:

adding at least one of tantalum, a tantalum compound, niobium and a niobium compound to a yttrium oxide powder to blend therewith;

forming the blended material to a yttrium oxide molded body containing at least one of the tantalum and the niobium; and sintering the yttrium oxide molded body at 1700° C. or more and 2000° C. or less under a vacuum, hydrogen or rare gas atmosphere.

According to a fifth aspect of the invention, as set forth in the fourth aspect of the invention, it is preferable that the tantalum or the tantalum compound is added in a range of 0.2 to 1.5 wt % to yttrium oxide in terms of metal.

According to a sixth aspect of the invention, as set forth in the fourth aspect of the invention, it is preferable that the niobium or the niobium compound is added in a range of 0.1 to 1.0 wt % to yttrium oxide in terms of metal.

According to a seventh aspect of the invention, as set forth in the fourth aspect of the invention, it is preferable that a specific surface area of yttrium oxide powder is 5 m$^2$/g or more and 50 m$^2$/g or less and at least one kind of tantalum and a tantalum compound is added in a range of 0.2 to 1.5 wt % in terms of metal.

According to an eighth aspect of the invention, as set forth in the fourth aspect of the invention, it is preferable that a specific surface area of yttrium oxide powder is 5 m$^2$/g or more and 50 m$^2$/g or less and at least one kind of niobium and a niobium compound is added in a range of 0.1 to 1.0 wt % in terms of metal.

According to a ninth aspect of the invention, as set forth in the second aspect of the invention, it is preferable that the tantalum is contained in a range of 0.1 to 0.3 wt % in terms of metal, the in-line transmittance at the thickness of 1 mm in a visible wavelength region in the range of 400 to 800 nm is 60% or more and no striae is contained.

According to a tenth aspect of the invention, as set forth in the third aspect of the invention, it is preferable that the niobium is contained in a range of 0.05 to 0.2 wt % in terms of metal, the in-line transmittance at a thickness of 1 mm in a visible wavelength region in a range of 400 to 800 nm is 60% or more and no striae is contained.

According to the above described aspects of the invention, aluminum does not segregates in grain boundaries of yttrium oxide during the sintering and the in-line transmittance in a visible wavelength region of 400 to 800 nm at a thickness of 1 mm can be made 60% or more. Furthermore, in almost all region in the visible wavelength region of 400 to 800 nm, the in-line transmittance of 80% or more can be obtained.

According to the invention, a special raw material in which silicon content is made 10 wt ppm or less may not be used. Still furthermore, without making a particle diameter of a raw material, yttrium oxide, 0.5 μm or less, the in-line transmittance in a visible wavelength region of 400 to 800 nm at a thickness of 1 mm can be made 60% or more. Further, if necessary, there can be provided a sintered body having no striae.

Further, according to an eleventh aspect of the invention, there is provided a transparent lutetium oxide sintered body, comprising:

lutetium oxide as a main component; and at least one of tantalum or niobium, wherein in-line transmittance at when a thickness thereof is 1 mm in a visible wavelength region in a range of 400 to 800 nm is 60% or more.

According to a twelfth aspect of the invention, as set forth in the eleventh aspect of the invention, it is preferable that when an amount of at least one of the tantalum or the niobium is in the range of 0.2 to 0.7 wt % in terms of metal and the thickness thereof is 1 mm, the in-line transmittance in the visible wavelength region in the range of 400 to 800 nm is 60% or more.

According to a thirteenth aspect of the invention, there is provided a manufacturing method of a transparent lutetium oxide sintered body, comprising:

adding at least one of a tantalum, a tantalum compound, a niobium and a niobium compound to a lutetium oxide powder to blend therewith;

forming a lutetium oxide molded body containing at least one of the tantalum or the niobium; and sintering the lutetium oxide molded body under a vacuum, hydrogen or rare gas atmosphere at 1750° C. or more.

According to a fourteenth aspect of the invention, as set forth in the thirteenth aspect of the invention, it is preferable that at least one of the tantalum, the tantalum compound, the niobium and the niobium compound is added in a range of 0.2 to 0.8 wt % to the lutetium oxide in terms of metal.

According to the invention, aluminum does not segregates in grain boundaries of lutetium oxide grains during the sintering and the in-line transmittance in the visible wavelength region of 400 to 800 nm at a thickness of 1 mm can be made 60% or more. Furthermore, according to the invention, even when a special raw material in which an aluminum content is made in a range of 5 to 100 wt ppm by in terms of metal and a silicon content is made 10 wt ppm or less in terms of metal is not used, the in-line transmittance in a visible wavelength region of 400 to 800 nm at a thickness of 1 mm can be made 60% or more.

Furthermore, according to a fifteenth aspect of the invention, there is provided a transparent ytterbium oxide sintered body, comprising:

ytterbium oxide as a main component; and at least one of tantalum or niobium, wherein in-line transmittance at when a thickness thereof is 1 mm in a visible wavelength region in a range of 400 to 800 nm is 60% or more.

According to a sixteenth aspect of the invention, as set forth in the fifteenth aspect of the invention, it is preferable that when an amount of at least one of the tantalum or the niobium is in a range of 0.1 to 0.7 wt % in terms of metal, and the thickness thereof is 1 mm, the in-line transmittance in the visible wavelength region in the range of 400 to 800 nm is 60% or more.

According to a seventeenth aspect of the invention, there is provided a manufacturing method of a transparent ytterbium oxide sintered body, comprising:

adding at least one of a tantalum, tantalum compound, a niobium and a niobium compound to a ytterbium oxide powder to blend therewith;

forming a ytterbium oxide molded body containing at least one of the tantalum or the niobium; and sintering the ytterbium oxide molded body under a vacuum, hydrogen or rare gas atmosphere at 1750° C. or more.

According to an eighteenth aspect of the invention, as set forth in the seventeenth aspect of the invention, it is preferable that at least one of the tantalum, the tantalum compound, the niobium and niobium compound is added in the range of 0.1 to 0.8 wt % to ytterbium oxide in terms of metal.

According to a nineteenth aspect of the invention, there is provided a rare earth oxide sintered body, comprising:

any one of yttrium oxide, lutetium oxide and ytterbium oxide as a main component; and at least one of tantalum and niobium at 0.2 wt % or more and 0.5 wt % or less in terms of metal, wherein in-line transmittance when a thickness thereof is 1 mm in a visible wavelength region in a range of 400 to 800 nm is 60% or more.

According to the invention, without adding, to a ytterbium oxide sintered body, aluminum in the range of 5 to 100 wt ppm in terms of metal and silicon of 10 wt ppm or less in terms of metal, the in-line transmittance in a visible wavelength region of 400 to 800 nm at a thickness of 1 mm can be made 60% or more.

In the invention, the in-line transmittance in a visible wavelength region in the range of 400 to 800 nm is focused on. This is because, since a visible wavelength region is used in ordinary usage, the in-line transmittance in the wavelength range is specified as 60% or more. However, the transparent oxide sintered body, without restricting to applications in the visible wavelength region, may be applied as well to a UV or infrared wavelength region.

DETAILED DESCRIPTION OF THE PREFERRED EMBODIMENTS

First Embodiment

At first, an aspect of the invention relating to a oxide sintered body including yttrium is described.

A transparent yttrium oxide sintered body of the invention contains yttrium oxide as a main component and at least one of tantalum and niobium and has the in-line transmittance of 60% or more at a thickness of 1 mm in a visible wavelength region in the range of 400 to 800 nm.

In the case of tantalum being contained, when the tantalum is contained 0.1% or more and 1.3 wt % or less in terms of metal, the in-line transmittance at a thickness of 1 mm in a visible wavelength region in the range of 400 to 800 nm is 60% or more. Furthermore, in the case of niobium being contained, when the niobium is contained 0.05% or more and 0.5 wt % or less in terms of metal, the in-line transmittance at a thickness of 1 mm in a visible wavelength region in the range of 400 to 800 nm is 60% or more.

In the invention, a reason why tantalum or niobium contributes to improve the transparency of an yttrium oxide sintered body is not clear. However, it is considered that tantalum and/or niobium is dissolved in yttrium oxide to form a solid solution to promote for ion defects to diffuse in yttrium oxide and thereby a crystal structure is homogenized and, when tantalum and/or niobium is added, yttrium oxide is delayed from grain growing and thereby pore elimination is promoted during the sintering. Owing to the actions, the in-line transmittance of the obtained yttrium oxide sintered body at a thickness of 1 mm in a visible wavelength region in the range of 400 to 800 nm can be made 60% or more.

In the invention, when tantalum and/or niobium is added, in order to obtain a transparent yttrium oxide sintered body, without necessitating to particularly use a yttrium oxide raw material small in an average particle diameter, a general-purpose powder can be used. However, in order not to leave pores in the sintered body, diameters of pores in a molding stage before the sintering are preferably small. In order to obtain a molded body having such small pore diameters, an yttrium oxide raw material powder having an average particle diameter of 2 μm or less is preferably used.

Contents of aluminum and silicon in an yttrium oxide raw material powder are not necessarily severely controlled.

However, since aluminum tends to segregate in grain boundaries of yttrium oxide during the sintering to form a hetero-phase, the transparency is inhibited from being improved.

Furthermore, since silicon tends to promote grain-growth of yttrium oxide, it is likely to diminish the grain-growth suppression action of tantalum and/or niobium.

Accordingly, concentrations of both aluminum and silicon in the yttrium oxide molded body are preferably set at 20 ppm or less.

In the invention, when tantalum and/or niobium is contained in yttrium oxide, the in-line transmittance at a thickness of 1 mm in a visible wavelength region in the range of 400 to 800 nm can be made 60% or more. However, in particular, when tantalum is added in the range of 0.1 wt % or more and 1.3 wt % or less in terms of metal and/or niobium is added in the range of 0.05 wt % or more and 0.5 wt % or less in terms of metal, the in-line transmittance of the yttrium oxide sintered body at a thickness of 1 mm in a visible wavelength region in the range of 400 to 800 nm, although in part of the lower wavelength region (400 to 500 nm), may not satisfy 80%, however, the in-line transmittance of 80% or more can be obtained substantially in the visible wavelength region. That is, an yttrium oxide sintered body extremely high in the transparency can be obtained.

When tantalum is contained less than 0.1 wt % in terms of metal or niobium is contained less than 0.05 wt % in terms of metal, tantalum and niobium insufficiently affect on yttrium oxide. Accordingly, an yttrium oxide sintered body such high in the transparency as exceeding 60% in the in-line transmittance at a thickness of 1 mm in a visible wavelength region in all the range of 400 to 800 nm cannot be obtained.

On the other hand, when tantalum is contained exceeding 1.3 wt % in terms of metal or niobium is contained exceeding 0.5 wt % in terms of metal, tantalum or niobium is generated to an extent that yttrium oxide cannot form a solid solution and exists dispersed in the yttrium oxide sintered body as a hetero-phase in a pyrochlore structure. As a result, in this case as well, the transparency is deteriorated, and thereby an yttrium oxide sintered body such high in the transparency as exceeding 60% in the in-line transmittance at a thickness of 1 mm in a visible wavelength region in all the range of 400 to 800 nm cannot be obtained.

A sintering temperature is set at 1700° C. or more. When the sintering temperature is less than 1700° C., a sintered body cannot be sufficiently densified and many pores are left inside of the sintered body. Accordingly, an yttrium oxide sintered body having high transparency cannot be obtained.

On the other hand, when the sintering temperature exceeds 2000° C., the volatilization speed of tantalum and/or niobium contained in added tantalum compound and niobium compound becomes very fast. Accordingly, it becomes very difficult to control an amount of tantalum and/or niobium remaining in the sintered body. Furthermore, under such a high temperature, since it becomes difficult to suppress growth speed of the yttrium oxide by the tantalum and/or niobium, the yttrium oxide excessively grows to tend to segregate a hetero-phase derived from added tantalum, the niobium and a slight amount of impurities in the periphery. Thus, an yttrium oxide sintered body having high light-transmitting property cannot be obtained.

From viewpoints of homogenizing a crystal structure owing to promotion of diffusion of ion defects in the yttrium oxide sintered body and inhibiting a hetero-phase from segregating in grain boundaries accompanying an excessive grain growth, a preferable range of the sintering temperature is in the range of 1800° C. or more and 1950° C. or less.

When a rare gas is used for an atmosphere during sintering, helium is most preferable among the rare gas. This is because the diffusion speed of helium is the fastest and air bubbles least remain in the sintered body.

Even though the amount of tantalum and/or niobium is in the range of the invention, when tantalum and/or niobium remain much in the sintered body, in spite of being sufficiently high in the in-line transmittance of visible light, striae tend to occur. When the sintered body is used in an application where the striae is not desirable, an amount of tantalum and/or niobium has to be reduced to eliminate the striae. However, when an amount of tantalum and/or niobium is reduced, the visible in-line transmittance tends to deteriorate. In view of the problem, the inventor found that when the specific surface area of yttrium oxide is increased, the tendency of deterioration of the in-line transmittance could be complemented. That is, according to the manufacturing methods of according to the seventh and eighth aspects of the invention, the sintered bodies according to the ninth and tenth aspects of the invention can be obtained.

FIRST EXAMPLES PART I

To an yttrium oxide powder having an average particle diameter of 1 μm, specific surface of 2.1 m$^2$/g and the purity of 99.9% (aluminum concentration: 1 ppm, silicon concentration: 18 ppm), ethanol, an acrylic binder and a tantalum compound or a niobium compound shown in Table 1-1 are added, followed by blending for 12 hr in a ball mill with zirconium oxide balls. From thus obtained slurry, a granulated powder having an average particle diameter of 40 μm was prepared with a spray dryer. The granulated powder was uniaxially molded at 20 MPa, followed by applying cold isostatic pressing (CIP) at 150 MPa to form a molded body, further followed by dewaxing in air. The dewaxed body was sintered at a temperature and in an atmosphere shown in Table 1-1 to form a sintered body. The sintered body was processed into a bifacial optically polished article having a diameter of 20 mm and a thickness of 1 mm. The in-line transmittance in the range of 400 to 800 nm was measured with a spectrophotometer.

As measurement results, the in-line transmittances at 600 nm as one example and evaluations in a wavelength region of 400 to 800 nm are shown in Table 1-1.

In the column of evaluation in Table 1-1, a mark "e" (excellent) shows one of which the in-line transmittance in a region from 400 to 800 nm is substantially 80% or more, a mark "g" (good) shows one of which the in-line transmittance in a region from 400 to 800 nm is less than 80% and 60% or more and a mark "b" (bad) shows one of which the in-line transmittance in a region from 400 to 800 nm is partially less than 60%. Furthermore, the sintered body, after measurement, was washed and measured of concentrations of tantalum, niobium, aluminum and silicon by ICP emission spectroscopy. Measurement results are together shown in Table 1-1.

| | comparative example No. | |
|---|---|---|
| | 1-1 | 1-2 |
| additive | none | |
| amount of additive (in terms of metal) (wt %) | — | — |
| sintering temperature (° C.) | 1900 | 1700 |
| sintering atmosphere | vacuum (less than 1 × 10⁻⁴ Pa) | vacuum (less than 1 × 10⁻⁴ Pa) |
| in-line transmittance (%) 600 nm | 46 | 31 |
| evaluation | b | b |
| tantalum concentration (wt %) | — | — |
| niobium concentration (wt %) | — | — |
| aluminum concentration | >1 ppm | >1 ppm |
| silicon concentration | 8 ppm | 15 ppm |

As obvious from Table 1-1, the yttrium oxide sintered body according to the invention, without setting an aluminum content in the range of 5 to 100 wt ppm in terms of metal and a silicon content at 10 wt ppm or less in terms of metal, can make the in-line transmittance at a thickness of 1 mm in a visible wavelength region in the range of 400 to 800 nm 60% or more.

TABLE 1-1

| | embodiments No. | | | | | | | |
|---|---|---|---|---|---|---|---|---|
| | 1-1 | 1-2 | 1-3 | 1-4 | 1-5 | 1-6 | 1-7 | 1-8 |
| additive | tantalum oxide | | | | | | | |
| amount of additive (in terms of metal) (wt %) | 0.1 | 0.2 | 0.5 | 1.0 | 1.5 | 1.7 | 1.0 | 1.0 |
| sintering temperature (° C.) | 1800 | 1800 | 1800 | 1800 | 1800 | 1700 | 1700 | 1770 |
| sintering atmosphere | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | hydrogen |
| in-line transmittance (%) 600 nm | 63 | 81 | 82 | 82 | 80 | 71 | 62 | 81 |
| evaluation | g | e | e | e | e | g | g | e |
| tantalum concentration (wt %) | 0.1 | 0.2 | 0.4 | 0.9 | 1.3 | 1.3 | 0.9 | 0.8 |
| niobium concentration (wt %) | — | — | — | — | — | — | — | — |
| aluminum concentration | >1 ppm | >1 ppm | >1 ppm | >1 ppm | >1 ppm | >1 ppm | >1 ppm | >1 ppm |
| silicon concentration | 14 ppm | 14 ppm | 15 ppm | 13 ppm | 15 ppm | 16 ppm | 14 ppm | 13 ppm |

| | embodiments No. | | | | | | | |
|---|---|---|---|---|---|---|---|---|
| | 1-9 | 1-10 | 1-11 | 1-12 | 1-13 | 1-14 | 1-15 | 1-16 |
| additive | niobium oxide | | | | | | | |
| amount of additive (in terms of metal) (wt %) | 0.05 | 0.1 | 0.3 | 0.5 | 0.7 | 1.0 | 0.5 | 0.5 |
| sintering temperature (° C.) | 1800 | 1800 | 1800 | 1800 | 1800 | 1800 | 1700 | 1770 |
| sintering atmosphere | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | vacuum (less than 1 × 10⁻⁴ Pa) | hydrogen |
| in-line transmittance (%) 600 nm | 63 | 80 | 82 | 82 | 80 | 62 | 64 | 81 |
| evaluation | g | e | e | e | e | g | g | e |
| tantalum concentration (wt %) | — | — | — | — | — | — | — | — |
| niobium concentration (wt %) | 0.05 | 0.1 | 0.3 | 0.4 | 0.5 | 0.8 | 0.4 | 0.3 |
| aluminum concentration | >1 ppm | >1 ppm | >1 ppm | >1 ppm | >1 ppm | >1 ppm | >1 ppm | >1 ppm |
| silicon concentration | 13 ppm | 14 ppm | 12 ppm | 14 ppm | 15 ppm | 13 ppm | 17 ppm | 11 ppm |

Furthermore, conventionally, when calcium oxide or zirconium oxide is added to improve the transparency, a particle diameter of yttrium oxide is required to be 0.5 μm or less. However, according to the invention, without miniaturizing a particle diameter of yttrium oxide such small as 0.5 μm or less, the in-line transmittance at a thickness of 1 mm in a visible wavelength region in the range of 400 to 800 nm can be made 60% or more.

FIRST EXAMPLES PART 2

There were prepared three kinds of yttrium oxide powders having, respectively, (1) an average particle diameter of 1.2 μm, the specific surface area of 5.4 $m^2/g$ and a purity of 99.9% (aluminum concentration: 1 ppm, silicon concentration: 11 ppm);

(2) an average particle diameter of 1.1 μm, the specific surface area of 46 $m^2/g$ and a purity of 99.9% (aluminum concentration: 1 ppm, silicon concentration: 11 ppm); and (3) an average particle diameter of 1.4 μm, the specific surface area of 4.3 $m^2/g$ and a purity of 99.9% (aluminum concentration: 1 ppm, silicon concentration: 11 ppm).

To the above three kinds of yttrium oxide powders, ethanol, an acrylic binder and a tantalum compound or a niobium compound shown in Table 1-2 were added, and blending for 12 hr in a ball mill with zirconium oxide balls. From each of thus obtained slurries, a granulated powder having an average particle diameter of 40 μm was prepared with a spray dryer.

The granulated powders were uniaxially molded at 20 MPa, followed by applying cold isostatic pressing (CIP) at 150 MPa to form molded bodies, further followed by dewaxing at 1000° C. in air. The dewaxed bodies were sintered at temperatures and in atmospheres shown in Table 1-2 to form sintered bodies. Thus obtained sintered bodies were processed into a bifacial optically polished articles having a diameter of 20 mm and a thickness of 1 mm.

The in-line transmittance thereof in the range of 400 to 800 nm was measured with a spectrophotometer. Measurement results are shown in Table 1-2. In the column of evaluation in Table 1-2, a mark "e" (excellent) shows one of which the in-line transmittance in a region from 400 to 800 nm is substantially 80% or more; a mark "g" (good) shows one of which the in-line transmittance in a region from 400 to 800 nm is less than 80% and 60% or more; and a mark "b" (bad) shows one of which the in-line transmittance in a region from 400 to 800 nm is partially less than 60%.

Furthermore, the presence of striae was visually observed. In the column of evaluation in Table 1-2, a mark "none" shows one in which the striae was not observed, a mark "presence" shows one in which striae was found, and a mark "-" shows one in which the presence of striae could not be judged because of insufficient transparency. Still furthermore, the sintered bodies, after measurement, were washed and measured of concentrations of tantalum and niobium by ICP (Inductively Coupled Plasma) emission spectroscopy. Measurement results are shown together in Table 1-2.

TABLE 1-2

| | embodiments No. | | | | | | | | |
|---|---|---|---|---|---|---|---|---|---|
| | a | b | c | d | e | f | g | h | i |
| additive | tantalum oxide | | | | | | | | |
| specific surface of yttrium oxide power ($m^2/g$) | 5.4 | | | | | | 46 | | 4.3 |
| amount of additive (in terms of metal) (wt %) | 0.3 | 1.5 | 0.3 | 1.5 | 1.0 | 1.0 | 0.3 | 1.5 | 1.5 |
| highest sintering temperature (° C.) | 1950 | 1950 | 1750 | 1750 | 1800 | 1800 | 1900 | 1900 | 1900 |
| highest sintering temperature maintaining hour | 3 | 32 | 10 | 66 | 40 | 48 | 5 | 36 | 5 |
| sintering atmosphere | vacuum (less than $10^{-4}$ Pa) | vacuum (less than $10^{-4}$ Pa) | vacuum (less than $10^{-4}$ Pa) | vacuum (less than $10^{-4}$ Pa) | hydrogen | helium | vacuum (less than $10^{-4}$ Pa) | vacuum (less than $10^{-4}$ Pa) | vacuum (less than $10^{-4}$ Pa) |
| in-line transmittance | e | e | g | g | e | g | e | e | e |
| present of striae | none | none | none | none | none | none | none | none | presence |
| tantalum concentration (wt %) | 0.1 | 0.3 | 0.3 | 0.3 | 0.1 | 0.2 | 0.1 | 0.3 | 0.4 |

| | embodiments No. | | | | | | | | |
|---|---|---|---|---|---|---|---|---|---|
| | j | k | l | m | n | o | p | q | r |
| additive | niobium oxide | | | | | | | | |
| specific surface of yttrium oxide power ($m^2/g$) | 5.4 | | | | | | 46 | | 4.3 |
| amount of additive (in terms of metal) (wt %) | 0.1 | 1.0 | 0.1 | 1.0 | 0.5 | 0.5 | 0.1 | 1.0 | 1.0 |
| highest sintering temperature (° C.) | 1950 | 1950 | 1750 | 1750 | 1800 | 1800 | 1900 | 1900 | 1900 |
| highest sintering temperature maintaining hour | 3 | 30 | 5 | 48 | 40 | 41 | 5 | 32 | 24 |
| sintering atmosphere | vacuum (less than $10^{-4}$ Pa) | vacuum (less than $10^{-4}$ Pa) | vacuum (less than $10^{-4}$ Pa) | vacuum (less than $10^{-4}$ Pa) | hydrogen | helium | vacuum (less than $10^{-4}$ Pa) | vacuum (less than $10^{-4}$ Pa) | vacuum (less than $10^{-4}$ Pa) |
| in-line transmittance | e | e | g | g | e | g | e | e | e |

TABLE 1-2-continued

| | | | | | | | | | |
|---|---|---|---|---|---|---|---|---|---|
| present of striae | none | none | none | none | none | none | none | none | presence |
| niobium concentration (wt %) | 0.06 | 0.20 | 0.08 | 0.20 | 0.20 | 0.20 | 0.05 | 0.20 | 0.30 |

| | comparative embodiments No. | | | | | | | |
|---|---|---|---|---|---|---|---|---|
| | s | t | u | v | w | X | y | z |
| additive | tantalum oxide | | | | niobium | | | |
| specific surface of yttrium oxide power (m²/g) | 4.3 | | 5.4 | | 4.3 | | 5.4 | |
| amount of additive (in terms of metal) (wt %) | 0.30 | 0.15 | 1.50 | 1.00 | 0.10 | 0.08 | 1.00 | 0.50 |
| highest sintering temperature (° C.) | 1950 | 1950 | 2050 | 1650 | 1950 | 1750 | 2050 | 1650 |
| highest sintering temperature maintaining hour | 3 | 2 | 1 | 30 | 3 | 3 | 1 | 30 |
| sintering atmosphere | vacuum (less than $10^{-4}$ Pa) | vacuum (less than $10^{-4}$ Pa) | vacuum (less than $10^{-4}$ Pa) | vacuum (less than $10^{-4}$ Pa) | vacuum (less than $10^{-4}$ Pa) | vacuum (less than $10^{-4}$ Pa) | vacuum (less than $10^{-4}$ Pa) | vacuum (less than $10^{-4}$ Pa) |
| in-line transmittance | b | b | b | b | b | b | b | b |
| present of striae | — | — | — | — | — | — | — | — |
| tantalum concentration (wt %) | 0.08 | 0.08 | 0.07 | 0.9 | — | — | — | — |
| niobium concentration (wt %) | — | — | — | — | 0.03 | 0.03 | 0.04 | 0.40 |

As obvious from Table 1-2, the yttrium oxide sintered body according to the invention, when the specific surface area and contents of tantalum and niobium are controlled, can be obtained as a sintered body free from striae.

Second Embodiment

Second, an aspect of the invention relating to an oxide sintered body including lutetium is described.

A transparent lutetium oxide sintered body of the invention contains lutetium oxide as a main component and at least one of tantalum or niobium and has the in-line transmittance of 60% or more at a thickness of 1 mm in a visible wavelength region in the range of 400 to 800 nm. When the tantalum or niobium is contained in the range of 0.2 wt % or more and 0.7 wt % or less in terms of metal, the in-line transmittance of 60% or more at a thickness of 1 mm in a visible wavelength region in the range of 400 to 800 nm can be obtained.

In the invention, a reason why tantalum or niobium contributes to improve the transparency of a lutetium oxide sintered body is not clear. However, it is considered that tantalum or niobium is dissolved in lutetium oxide to form a solid solution to promote for ion defects to diffuse in lutetium oxide and thereby a crystal structure is homogenized and, when tantalum or niobium is added, lutetium oxide is delayed from grain growing and thereby pore elimination is promoted during the sintering. Owing to the actions, the in-line transmittance of the obtained lutetium oxide sintered body at a thickness of 1 mm in a visible wavelength region in the range of 400 to 800 nm can be made 60% or more.

In the invention, when tantalum or niobium is added, in order to obtain a transparent lutetium oxide sintered body, without necessitating to particularly use a lutetium oxide raw material small in an average particle diameter, a general-purpose powder can be used. However, in order not to leave pores in the sintered body, diameters of pores in a molding stage before the sintering are preferably small. In order to obtain a molded body having such small pore diameters, a lutetium oxide raw material powder having an average particle diameter of 2 μm or less is preferably used.

Contents of aluminum and silicon in a lutetium oxide raw material powder are not necessarily severely controlled. However, since aluminum tends to segregate in grain boundaries of lutetium oxide grains during the sintering to form a hetero-phase, the transparency is inhibited from being improved. Furthermore, since silicon tends to promote grain growth of lutetium oxide, it is likely to diminish the grain growth suppression action of tantalum or niobium. Accordingly, concentrations of both aluminum and silicon in the lutetium oxide molded body are preferably set at 20 ppm or less.

In the invention, when tantalum or niobium is contained in lutetium oxide, the in-line transmittance at a thickness of 1 mm in a visible wavelength region in the range of 400 to 800 nm can be made 60% or more. However, in particular, when tantalum or niobium is added in the range of 0.2 wt % or more and 0.7 wt % or less in terms of metal, the in-line transmittance of the lutetium oxide sintered body at a thickness of 1 mm in a visible wavelength region in the range of 400 to 800 nm, although in part of the lower wavelength region (400 to 500 nm), may not satisfy 78%, however, the in-line transmittance of 78% or more can be obtained substantially in the visible wavelength region. That is, a lutetium oxide sintered body extremely high in the transparency can be obtained.

When tantalum or niobium is contained less than 0.2 wt % in terms of metal, tantalum or niobium insufficiently affects on lutetium oxide. Accordingly, a lutetium oxide sintered body having such high transparency as exceeding 60% in the in-line transmittance at a thickness of 1 mm in the visible wavelength region in all the range of 400 to 800 nm cannot be obtained.

On the other hand, when tantalum or niobium is contained exceeding 0.7 wt % in terms of metal, tantalum or niobium is generated to an extent that lutetium oxide cannot form a solid solution and exists dispersed in the lutetium oxide sintered body as a hetero-phase. As a result, the transparency is deteriorated, and thereby a lutetium oxide sintered body such high in the transparency as exceeding 60% in the in-line transmittance at a thickness of 1 mm in a visible wavelength region in all the range of 400 to 800 nm cannot be obtained.

The transparent lutetium oxide sintered body according to the invention can be manufactured in such a manner that at least one of a tantalum, a tantalum compound, a niobium and a niobium compound is added to a lutetium oxide powder to form a molded body and the molded body is sintered. The lutetium oxide powder that is used as a raw material here may be a general-purpose powder as mentioned above. However, a lutetium oxide powder having an average particle diameter of 2 μm or less is preferably used. Furthermore, concentrations of both aluminum and silicon in the lutetium oxide molded body are preferably 20 ppm or less. The forming is carried out according to a normal method such as a cold isostatic pressing (CIP) after molding with a uniaxial mold. Thereafter, the formed body is dewaxed and sintered to form a sintered body. The sintering is carried out in a vacuum, hydrogen or rare gas atmosphere. In order to heighten the transparency of a lutetium oxide sintered body, residual pores in the sintered body have to be reduced to a level as low as possible. For this, a sintering atmosphere is preferably a hydrogen, vacuum or rare gas atmosphere where the diffusion speed is high.

When a rare gas is used for an atmosphere during sintering, helium is most preferable among the rare gas. This is because the diffusion speed of helium is the fastest and air bubbles least remain in the sintered body.

Furthermore, a sintering temperature is set at 1750° C. or more and preferably at 1800° C. or more to promote diffusion of ion defects in grains to homogenize a crystal structure. When the sintering temperature is less than 1750° C., since sufficient densification cannot be obtained and many pores remain inside of the sintered body, a sintered body having such high transparency as 60% or more in the in-line transmittance in a visible wavelength region of 400 to 800 nm at a thickness of 1 mm can not be obtained. Upper limit of the sintering temperature is the same as the that of the yttrium oxide sintered body. Accordingly, the upper limit of the sintering temperature, from viewpoints of inhibiting a heterophase from segregating in grain boundaries accompanying an excessive grain growth, is preferably set at 2000° C., more preferably at 1950° C.

SECOND EXAMPLES

To a lutetium oxide powder having an average particle diameter of 1 μm and the purity of 99.9% (aluminum concentration: 1 ppm, silicon concentration: 18 ppm), ethanol, an acrylic binder and a tantalum compound or a niobium compound shown in Table 2 are added, followed by blending for 12 hr in a ball mill with zirconium oxide balls. From thus obtained slurry, a granulated powder having an average particle diameter of 45 μm was prepared with a spray dryer. The granulated powder was uniaxially molded at 20 MPa, followed by applying cold isostatic pressing (CIP) at 150 MPa to form a molded body, further followed by dewaxing at 700° C. in air. The dewaxed body was sintered at a temperature and in an atmosphere shown in Table 2 to form a sintered body. The sintered body was processed into a bifacial optically polished article having a diameter of 20 mm and a thickness of 1 mm. The in-line transmittance in the range of 400 to 800 nm was measured with a spectrophotometer. As measurement results, the in-line transmittances at 600 nm as one example and evaluations in a wavelength region of 400 to 800 nm are shown in Table 2

In the column of evaluation in Table 2, a mark "e" (excellent) shows one of which the in-line transmittance in all region from 400 to 800 nm is substantially 78% or more, a mark "g" (good) shows one of which the in-line transmittance in all region from 400 to 800 nm is 60% or more and a mark "b" (bad) shows one of which the in-line transmittance in a region from 400 to 800 nm is partially less than 60%. Furthermore, the sintered body, after measurement, was washed and measured of concentrations of tantalum, niobium, aluminum and silicon by ICP emission spectroscopy. Measurement results are together shown in Table 2.

TABLE 2

| | | embodiments No. | | | | | | | |
|---|---|---|---|---|---|---|---|---|---|
| | | 2-1 | 2-2 | 2-3 | 2-4 | 2-5 | 2-6 | 2-7 | 2-8 |
| additive | | tantalum oxide | | | | | | | |
| amount of additive (in terms of metal) (wt %) | | 0.1 | 0.2 | 0.4 | 0.6 | 0.6 | 0.8 | 0.9 | 0.6 |
| sintering temperature (° C.) | | 1900 | 1900 | 1900 | 1900 | 1750 | 1900 | 1900 | 1800 |
| sintering atmosphere | | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | hydrogen |
| in-line transmittance (%) | 600 nm | 62 | 78 | 79 | 80 | 78 | 79 | 64 | 79 |
| | evaluation | g | e | e | e | e | e | g | e |
| tantalum concentration | | 0.1 wt % | 0.2 wt % | 0.4 wt % | 0.5 wt % | 0.6 wt % | 0.7 wt % | 0.8 wt % | 0.4 wt % |
| niobium concentration | | <10 ppm | <10 ppm | <10 ppm | <10 ppm | <10 ppm | <10 ppm | <10 ppm | <10 ppm |
| aluminum concentration | | <1 ppm | <1 ppm | <1 ppm | <1 ppm | <1 ppm | <1 ppm | <1 ppm | <1 ppm |
| silicon concentration | | 13 ppm | 14 ppm | 13 ppm | 13 ppm | 16 ppm | 14 ppm | 14 ppm | 12 ppm |
| | | embodiments No. | | | | | | | |
| | | 2-9 | 2-10 | 2-11 | 2-12 | 2-13 | 2-14 | 2-15 | 2-16 |
| additive | | niobium oxide | | | | | | | |
| amount of additive (in terms of metal) (wt %) | | 0.1 | 0.2 | 0.4 | 0.4 | 0.6 | 0.8 | 0.9 | 0.4 |
| sintering temperature (° C.) | | 1900 | 1900 | 1900 | 1750 | 1900 | 1900 | 1900 | 1800 |
| sintering atmosphere | | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | hydrogen |

TABLE 2-continued

| in-line | 600 nm | 64 | 78 | 80 | 78 | 79 | 78 | 61 | 78 |
|---|---|---|---|---|---|---|---|---|---|
| transmittance (%) | evaluation | g | e | e | e | e | e | g | e |
| tantalum concentration | | <10 ppm | <10 ppm | <10 ppm | <10 ppm | <10 ppm | <10 ppm | <10 ppm | <10 ppm |
| niobium concentration | | 0.1 wt % | 0.2 wt % | 0.4 wt % | 0.4 wt % | 0.6 wt % | 0.7 wt % | 0.8 wt % | 0.3 wt % |
| aluminum concentration | | <1 ppm | <1 ppm | <1 ppm | <1 ppm | <1 ppm | <1 ppm | <1 ppm | <1 ppm |
| silicon concentration | | 13 ppm | 13 ppm | 13 ppm | 17 ppm | 12 ppm | 13 ppm | 14 ppm | 11 ppm |

| | comparative examples No. | | | |
|---|---|---|---|---|
| | 2-1 | 2-2 | 2-3 | 2-4 |
| additive | none | | tantalum oxide | niobium oxide |
| amount of additive (in terms of metal) (wt %) | — | — | 0.6 wt % | 0.4 wt % |
| sintering temperature (° C.) | 1900 | 1800 | 1730 | 1730 |
| sintering atmosphere | vacuum (less than 1 × 10⁻⁴ Pa) | hydrogen | vacuum (less than 1 × 10⁻⁴ Pa) | vacuum (less than 1 × 10⁻⁴ Pa) |
| in-line 600 nm transmittance (%) evaluation | 26 b | 22 b | 54 b | 52 b |
| tantalum concentration | <10 ppm | <10 ppm | 0.6 wt % | <10 ppm |
| niobium concentration | <10 ppm | <10 ppm | <10 ppm | 0.4 wt % |
| aluminum concentration | <1 ppm | <1 ppm | <1 ppm | <1 ppm |
| silicon concentration | 13 ppm | 12 ppm | 16 ppm | 15 ppm |

As obvious from Table 2, the lutetium oxide sintered body according to the invention, without setting, as before, an aluminum content in the range of 5 to 100 wt ppm in terms of metal and a silicon content at 10 wt ppm or less in terms of metal, can make the in-line transmittance at a thickness of 1 mm in a visible wavelength region in the range of 400 to 800 nm 60% or more.

Furthermore, when an addition amount of tantalum or niobium is set 0.2 wt % or more in terms of metal, the in-line transmittance at a thickness of 1 mm in a visible wavelength region in the range of 400 to 800 nm can be made substantially 78% or more.

Third Embodiment

Next, an aspect of the invention relating to an oxide sintered body including ytterbium is described.

A transparent ytterbium oxide sintered body according to the invention includes ytterbium oxide as a main component and at least one of tantalum or niobium and has the in-line transmittance at a thickness of 1 mm in a visible wavelength region in the range of 400 to 800 nm of 60% or more. Furthermore, when the tantalum or the niobium is contained in the range of 0.1 wt % or more and 0.7 wt % or less in terms of metal, a transparent ytterbium oxide sintered body having such high transparency as 78% or more at 1 mm in the in-line transmittance in a visible wavelength region in the range of 400 to 800 nm can be obtained (note that in a part of low wave length side (400 to 500 nm), there is a case that the transparency does not reach to 78%, however, the transparency of 78% or more can be substantially achieved in the visible wave length region).

When tantalum or niobium is contained less than 0.1 wt % in terms of metal, tantalum or niobium insufficiently affects on ytterbium oxide. Accordingly, a ytterbium oxide sintered body having such high transparency as exceeding 60% in the in-line transmittance at a thickness of 1 mm in a visible wavelength region in the range of 400 to 800 nm cannot be obtained.

On the other hand, when tantalum or niobium is contained exceeding 0.7 wt % in terms of metal, tantalum or niobium that cannot be dissolved in ytterbium oxide exists as a heterophase dispersed in the ytterbium oxide sintered body to form a solid solution. As a result, the transparency is deteriorated, and thereby a ytterbium oxide sintered body having such high transparency as exceeding 60% in the in-line transmittance at a thickness of 1 mm in a visible wavelength region in the range of 400 to 800 nm cannot be obtained.

A manufacturing method of a transparent ytterbium oxide sintered body of the invention is carried out in such a manner that at least one of a tantalum, a tantalum compound, a niobium or a niobium compound are added to and blended with a ytterbium oxide powder. The blended material is formed into a ytterbium oxide molded body containing tantalum or niobium. Then, the molded body is sintered at 1750° C. or more in a vacuum, hydrogen or rare gas atmosphere.

When a rare gas is used for an atmosphere during sintering, helium is most preferable among the rare gas. This is because the diffusion speed of helium is the fastest and air bubbles least remain in the sintered body.

When the sintering temperature is less than 1750° C., since the sintering is insufficiently carried out, a transparent ytterbium oxide sintered body having such the high in-line transmittance as exceeding 60% at a thickness of 1 mm in a visible wavelength region of 400 to 800 nm cannot be obtained. Further, for the same reason as that of manufacturing method of the lutetium oxide sintered body, the sintering temperature is preferably 2000° C. or less and more preferably, 1950° C. or less. When an addition amount of at least one of tantalum, tantalum compound, niobium or a niobium compound thereof is set, to ytterbium oxide, in the range of 0.2 to 0.8 wt %, a transparent ytterbium oxide sintered body having such the high in-line transmittance as exceeding 60% at a thickness of 1 mm in a visible wavelength region of 400 to 800 nm can be obtained.

In the invention, a reason why tantalum or niobium contributes to improve the transparency of an ytterbium oxide sintered body is not clear. However, it is considered that tantalum or niobium is dissolved in ytterbium oxide to form a solid solution therewith to promote for ion defects to diffuse in ytterbium oxide and thereby a crystal structure is homogenized. When tantalum or niobium is added, ytterbium oxide is delayed from grain growing and thereby pore elimination is promoted during the sintering. Owing to the actions, the in-line transmittance of the obtained ytterbium oxide sintered body at a thickness of 1 mm in a visible wavelength region in the range of 400 to 800 nm can be made 60% or more.

A raw material powder of an ytterbium oxide raw material that is used to obtain a transparent ytterbium oxide sintered body may be a general-purpose fine powder. However, in order not to leave pores in a sintered body, a pore diameter in a molded body before sintering is preferably as small as possible. In order to obtain a molded body having such small pore diameter, an ytterbium oxide raw material powder having an average particle diameter of 2 μm or less is preferably used to form a molded body. Contents of aluminum and silicon in the ytterbium oxide raw material powder are not necessarily severely controlled. However, since aluminum tends to segregate in grain boundaries of ytterbium oxide grains during the sintering to form a hetero-phase, the transparency is inhibited from being improved. Furthermore, since silicon tends to promote grain growth of ytterbium oxide, it is likely to diminish the grain growth suppression action of tantalum or niobium. Accordingly, concentrations of both aluminum and silicon in the ytterbium oxide molded body are preferably set at 20 ppm or less. However, when an adding amount of tantalum or niobium is appropriately increased, even when the silicon concentration exceeds 20 ppm, the in-line transmittance in a visible wavelength region in the range of 400 to 800 nm of the sintered body can made 70% or more at a thickness of 1 mm.

THIRD EXAMPLES

To an ytterbium oxide powder having an average particle diameter of 1 μm and the purity of 99.9% (aluminum concentration: 1 ppm, silicon concentration: 18 ppm), ethanol, an acrylic binder and niobium oxide shown in Table 3 are added, followed by blending for 20 hr in a ball mill with zirconium oxide balls. From thus obtained slurry, a granulated powder having an average particle diameter of 50 μm was prepared with a spray dryer. The granulated powder was uniaxially molded at 10 MPa, followed by applying cold isostatic pressing (CIP) at 100 MPa to form a molded body, further followed by dewaxing at 900° C. in air. The dewaxed body was sintered at a temperature and in an atmosphere shown in Table 3 to form a sintered body. The sintered body was processed into a bifacial optically polished article having a diameter of 20 mm and a thickness of 1 mm. The in-line transmittance in the range of 400 to 800 nm was measured with a spectrophotometer. The in-line transmittance (%) at 700 nm and the transmittance in the range of 400 to 800 nm were measured. In Table 3, a measurement having a value of substantially 78% or more is shown with a mark "e" (excellent), a measurement having a value of 60% or more is shown with a mark "g" (good) and a measurement having a value less than 60% is shown with a mark b (bad).

TABLE 3

| | | embodiments No. | | | | | |
|---|---|---|---|---|---|---|---|
| | 3-1 | 3-2 | 3-3 | 3-4 | 3-5 | 3-6 | 3-7 |
| amount of Nb (in terms of metal) (wt %) | 0.007 | 0.200 | 0.500 | 0.750 | 0.200 | 0.200 | 0.200 |
| sintering temperature (° C.) | 1850 | 1850 | 1850 | 1850 | 1850 | 1750 | 1850 |
| sintering atmosphere | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) | hydrogen | vacuum (less than $1 \times 10^{-4}$ Pa) | vacuum (less than $1 \times 10^{-4}$ Pa) |
| in-line transmittance (%) 700 nm | 65.6 | 81.0 | 80.5 | 70.3 | 80.0 | 77.2 | 71.2 |
| evaluation | g | e | e | g | e | g | g |
| niobium concentration | 0.007 wt % | 0.190 wt % | 0.480 wt % | 0.720 wt % | 0.180 wt % | 0.190 wt % | 0.200 wt % |
| aluminum concentration | <1 ppm | <1 ppm | <1 ppm | <1 ppm | <1 ppm | <1 ppm | <1 ppm |
| silicon concentration | 16 ppm | 17 ppm | 15 ppm | 18 ppm | 14 ppm | 17 ppm | 40 ppm |

| | | comparative examples No. | | | |
|---|---|---|---|---|---|
| | 3-1 | 3-2 | 3-3 | 3-4 |
| amount of Nb (in terms of metal) (wt %) | 0.000 | 0.005 | 1.000 | 0.200 |
| sintering temperature (° C.) | 1900 | 1850 | 1850 | 1650 |
| sintering atmosphere | vacuum (less than $1 \times 10^{-4}$ Pa) | vacuum (less than $1 \times 10^{-4}$ Pa) | vacuum (less than $1 \times 10^{-4}$ Pa) | vacuum (less than $1 \times 10^{-4}$ Pa) |
| in-line transmittance (%) 700 nm | 26.2 | 45.0 | 57.0 | 34.0 |
| evaluation | b | b | b | b |
| niobium concentration | <10 ppm | 0.004 wt % | 0.950 wt % | 0.200 wt % |
| aluminum concentration | <1 ppm | <1 ppm | <1 ppm | <1 ppm |
| silicon concentration | 12 ppm | 18 ppm | 17 ppm | 18 ppm |

As obvious from Table 3, according to the invention, without setting an aluminum content in the range of 5 to 100 wt ppm in terms of metal and a silicon content at less than 10 wt ppm in terms of metal, when tantalum or niobium is contained, the ytterbium oxide sintered body having the in-line transmittance of 60% or more in a visible wavelength region in the range of 400 to 800 nm at a thickness of 1 mm can be obtained. In particular, when an addition amount of tantalum or niobium is set in the range of 0.2 to 0.7 wt % in terms of metal, the in-line transmittance in a visible wavelength region in the range of 400 to 800 nm at a thickness of 1 mm can be made substantially 78% or more. Still furthermore, it is found that a sintering temperature at 1750° C. or more is necessary to obtain the transparent ytterbium oxide sintered body.

As for the lutetium oxide or the ytterbium oxide, when avoiding the generation of striae is desired, as the same as that of the yttrium oxide, employing main material having specific surface of 5 m²/g or more and reducing the amount of the tantalum or the niobium.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

This application claims priority from Japanese Patent Application 2005-317297, filed Oct. 31, 2005; Japanese Patent Application 2006-009003, filed Jan. 17, 2006; and Japanese Patent Application 2006-078294, filed Mar. 22, 2006, which are incorporated herein by reference in their entirety.

What is claimed is:

1. A transparent yttrium oxide sintered body, comprising:
yttrium oxide as a main component; and
niobium in solid solution with the yttrium oxide;
wherein in-line transmittance when a thickness thereof is 1 mm in a visible wavelength region in a range of 400 to 800 nm is 60% or more.

2. The transparent yttrium oxide sintered body according to claim 1, wherein the body further comprises tantalum in solid solution with the yttrium oxide.

3. The transparent yttrium oxide sintered body according to claim 2, wherein the body comprises tantalum in a range of 0.1 to 1.3 wt % in terms of metal.

4. A manufacturing method of a transparent yttrium oxide sintered body, comprising:
adding at least one of niobium and a niobium compound to a yttrium oxide powder to blend therewith;
forming the blended material to a yttrium oxide molded body containing the niobium; and
sintering the yttrium oxide molded body at 1700° C. or more and 2000° C. or less under a vacuum, hydrogen or rare gas atmosphere to form a transparent yttrium oxide sintered body comprising yttrium oxide as a main component and niobium in solid solution with the yttrium oxide, wherein in-line transmittance when a thickness of the yttrium oxide sintered body is 1 mm in a visible wavelength region in a range of 400 to 800 nm is 60% or more.

5. The manufacturing method of the transparent yttrium oxide sintered body according to claim 4, wherein in the adding step tantalum or tantalum compound is further added in a range of 0.2 to 1.5 wt % to yttrium oxide in terms of metal to form a transparent yttrium oxide sintered body further containing tantalum in solid solution with the yttrium oxide.

6. The manufacturing method of a transparent yttrium oxide sintered body according to claim 4, wherein the niobium or the niobium compound is added in a range of 0.1 to 1.0 wt % to yttrium oxide in terms of metal.

7. The manufacturing method of the transparent yttrium oxide sintered body according to claim 4, wherein a specific surface area of yttrium oxide powder is 5 m²/g or more and 50 m²/g or less and
wherein in the adding step at least one of tantalum and a tantalum compound is further added in a range of 0.2 to 1.5 wt % in terms of metal to form a transparent yttrium oxide sintered body further containing tantalum in solid solution with the yttrium oxide.

8. The manufacturing method of a transparent yttrium oxide sintered body according to claim 4, wherein a specific surface area of yttrium oxide powder is 5 m²/g or more and 50 m²/g or less and
at least one of niobium and a niobium compound is added in a range of 0.1 to 1.0 wt % in terms of metal.

9. The transparent yttrium oxide sintered body according to claim 3, wherein the tantalum is contained in a range of 0.1 to 0.3 wt % in terms of metal, and no striae is contained.

10. A transparent yttrium oxide sintered body, comprising:
yttrium oxide as a main component; and
niobium;
wherein the niobium is contained in a range of 0.05 to 0.2 wt % in terms of metal,
wherein the in-line transmittance at a thickness of 1 mm in a visible wavelength region in a range of 400 to 800 nm is 60% or more and no striae is contained.

11. The transparent yttrium oxide sintered body according to claim 1, wherein the body comprises niobium in a range of 0.05 to 0.5 wt % in terms of metal.

12. The transparent yttrium oxide sintered body according to claim 11, wherein the body comprises niobium in a range of 0.05 to 0.2 wt % in terms of metal and the sintered body does not contain striae.

* * * * *